United States Patent
Xu et al.

(10) Patent No.: US 8,311,111 B2
(45) Date of Patent: Nov. 13, 2012

(54) SYSTEM AND METHOD FOR DECODING USING PARALLEL PROCESSING

(75) Inventors: Yaowu Xu, Clifton Park, NY (US); Paul Wilkins, Cambridge (GB); James Bankoski, North Greenbush, NY (US)

(73) Assignee: Google Inc., Mountain View, CA (US)

( * ) Notice: Subject to any disclaimer, the term of this patent is extended or adjusted under 35 U.S.C. 154(b) by 949 days.

(21) Appl. No.: 12/329,248

(22) Filed: Dec. 5, 2008

(65) Prior Publication Data

US 2010/0061455 A1    Mar. 11, 2010

Related U.S. Application Data

(60) Provisional application No. 61/096,223, filed on Sep. 11, 2008.

(51) Int. Cl.
*H04N 7/12* (2006.01)
(52) U.S. Cl. ......... 375/240.13; 375/240.08; 375/240.24; 375/240.25; 375/240.26
(58) Field of Classification Search ............. 375/240.08, 375/240.24–240.26
See application file for complete search history.

(56) References Cited

U.S. PATENT DOCUMENTS

| | | | |
|---|---|---|---|
| 3,825,832 A | 7/1974 | Frei et al. |
| 4,719,642 A | 1/1988 | Lucas |
| 4,729,127 A | 3/1988 | Chan et al. |
| 4,736,446 A | 4/1988 | Reynolds et al. |
| 4,868,764 A | 9/1989 | Richards |
| 4,891,748 A | 1/1990 | Mann |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,164,819 A | 11/1992 | Music |
| 5,270,812 A | 12/1993 | Richards |
| 5,274,442 A | 12/1993 | Murakami et al. |
| 5,313,306 A | 5/1994 | Kuban et al. |
| 5,341,440 A | 8/1994 | Earl et al. |

(Continued)

FOREIGN PATENT DOCUMENTS

| WO | 2008/036237 A2 | 3/2008 |
|---|---|---|
| WO | 2010/063184 A1 | 6/2010 |

OTHER PUBLICATIONS

Rajan L. Josh, Thomas R. Fischer, Roberto H. Bamberger; Lossy Encoding of Motion Vectors Using Entropy-Constrained Vector Quantization; School of Electrical Engineering and Computer Science Washington State University, Pullman WA.

(Continued)

*Primary Examiner* — Sath V Perungavoor
*Assistant Examiner* — Geepy Pe
(74) *Attorney, Agent, or Firm* — Young Basile Hanlon & MacFarlane P.C.

(57) ABSTRACT

Decoding a stream of encoded video data involves partitions that have been compressed using lossless encoding. Each partition includes rows that have also been encoded using intra-frame or inter-frame encoding. During the decoding process, two or more of the partitions are entropy decoded on two or more processors in parallel, except that partitions containing adjacent rows in the frame are decoded with an offset so that at least a portion of the output of the entropy decoding of one partition can be used as input in the entropy and intra/inter-frame decoding of the other.

19 Claims, 5 Drawing Sheets

U.S. PATENT DOCUMENTS

| | | | |
|---|---|---|---|
| 5,381,145 A | 1/1995 | Allen et al. |
| 5,432,870 A | 7/1995 | Schwartz |
| 5,452,006 A | 9/1995 | Auld |
| 5,561,477 A | 10/1996 | Polit |
| 5,576,765 A | 11/1996 | Cheney et al. |
| 5,576,767 A | 11/1996 | Lee et al. |
| 5,589,945 A | 12/1996 | Abecassis |
| 5,659,539 A | 8/1997 | Porter et al. |
| 5,696,869 A | 12/1997 | Abecassis |
| 5,734,744 A | 3/1998 | Wittenstein et al. |
| 5,737,020 A | 4/1998 | Hall et al. |
| 5,748,247 A | 5/1998 | Hu |
| 5,774,593 A | 6/1998 | Zick et al. |
| 5,793,647 A | 8/1998 | Hageniers et al. |
| 5,818,969 A | 10/1998 | Astle |
| 5,828,370 A | 10/1998 | Moeller et al. |
| 5,835,144 A | 11/1998 | Matsumura et al. |
| 5,883,671 A | 3/1999 | Keng et al. |
| 5,903,264 A | 5/1999 | Moeller et al. |
| 5,929,940 A | 7/1999 | Jeannin |
| 5,930,493 A | 7/1999 | Ottesen et al. |
| 5,963,203 A | 10/1999 | Goldberg et al. |
| 5,999,641 A | 12/1999 | Miller et al. |
| 6,014,706 A | 1/2000 | Cannon et al. |
| 6,041,145 A | 3/2000 | Hayashi et al. |
| 6,061,397 A | 5/2000 | Ogura |
| 6,084,908 A | 7/2000 | Chiang et al. |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,125,144 A | 9/2000 | Matsumura et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,240,135 B1 | 5/2001 | Kim |
| 6,292,837 B1 | 9/2001 | Miller et al. |
| 6,327,304 B1 | 12/2001 | Miller et al. |
| 6,370,267 B1 | 4/2002 | Miller et al. |
| 6,400,763 B1 | 6/2002 | Wee |
| 6,414,995 B2 | 7/2002 | Okumura et al. |
| 6,418,166 B1 | 7/2002 | Wu et al. |
| 6,522,784 B1 | 2/2003 | Zlotnick |
| 6,529,638 B1 | 3/2003 | Westerman |
| 6,560,366 B1 | 5/2003 | Wilkins |
| 6,687,303 B1 | 2/2004 | Ishihara |
| 6,697,061 B1 | 2/2004 | Wee et al. |
| 6,707,952 B1 | 3/2004 | Tan et al. |
| 6,765,964 B1 | 7/2004 | Conklin |
| 6,826,229 B2 | 11/2004 | Kawashima et al. |
| 6,934,419 B2 | 8/2005 | Zlotnick |
| 6,985,526 B2 | 1/2006 | Bottreau et al. |
| 6,987,866 B2 | 1/2006 | Hu |
| 7,027,654 B1 | 4/2006 | Ameres et al. |
| 7,116,831 B2 | 10/2006 | Mukerjee et al. |
| 7,170,937 B2 | 1/2007 | Zhou |
| 7,226,150 B2 | 6/2007 | Yoshimura et al. |
| 7,227,589 B1 | 6/2007 | Yeo et al. |
| 7,236,524 B2 | 6/2007 | Sun et al. |
| 7,330,509 B2 | 2/2008 | Lu et al. |
| 7,499,492 B1 | 3/2009 | Ameres et al. |
| 2002/0031184 A1 | 3/2002 | Iwata |
| 2002/0168114 A1 | 11/2002 | Valente |
| 2003/0023982 A1 | 1/2003 | Lee et al. |
| 2003/0189982 A1 | 10/2003 | MacInnis |
| 2003/0215018 A1 | 11/2003 | MacInnis et al. |
| 2004/0120400 A1 | 6/2004 | Linzer |
| 2004/0228410 A1 | 11/2004 | Ameres et al. |
| 2004/0240556 A1 | 12/2004 | Winger et al. |
| 2004/0258151 A1 | 12/2004 | Spampinato |
| 2005/0147165 A1 | 7/2005 | Yoo et al. |
| 2005/0169374 A1 | 8/2005 | Marpe et al. |
| 2005/0265447 A1 | 12/2005 | Park |
| 2005/0265461 A1 | 12/2005 | Raveendran |
| 2005/0276323 A1 | 12/2005 | Martemyanov et al. |
| 2006/0098737 A1 | 5/2006 | Sethuraman et al. |
| 2006/0215758 A1 | 9/2006 | Kawashima |
| 2006/0239345 A1 | 10/2006 | Taubman et al. |
| 2007/0025441 A1 | 2/2007 | Ugur et al. |
| 2007/0086528 A1 | 4/2007 | Mauchly et al. |
| 2007/0140342 A1 | 6/2007 | Karczewicz et al. |
| 2007/0286288 A1 | 12/2007 | Smith et al. |
| 2008/0152014 A1 | 6/2008 | Schreier et al. |
| 2008/0159407 A1 | 7/2008 | Yang et al. |
| 2008/0212678 A1 | 9/2008 | Booth et al. |

OTHER PUBLICATIONS

Armando J. Pinho; Encoding of Image Partitions, Using a Standard Technique for Lossless Image Compression; Dep. Electronica e Telecomunicacoes/ INESC Universidade de Aveiro, Portugal.

Rajasvaran Logeswaran; A Prediction-Based Neural Network Scheme for Lossless Data Compression; Multimedia University, Malaysia.

T. Chen, Y.H. Ng; Lossless Color Image Compression Technique for Multimedia Applications; IBM Technical Disclosure Bulletin; vol. 37 No. 10, Oct. 1994.

Method for the encoding of a compressed video sequence derived from the same video sequence compressed at a different bit rate without loss of data.

U.S. Appl. No. 12/102,694, Video Compression and Encoding Method, filed Apr. 14, 2008.

U.S. Appl. No. 11/932,870, Video Compression and Encoding Method, filed Oct. 31, 2007.

ON2 Technologies, Inc., White Paper TrueMotion VP7 Video Codec, Jan. 10, 2005, 13 pages, Document Version: 1.0, Clifton Park, New York.

ON2 Technologies, Inc., White Paper On2's TrueMotion VP7 Video Codec, Jul. 11, 2008, pp. 7 pages, Document Version:1.0, Clifton Park, New York.

Sikora, T. et al., Shape-adaptive DCT for generic coding of video, Circuits and Systems for Video Technology, IEEE Transactions on vol. 5, Issue 1, p. 59-62, Feb. 1, 1995.

Wiegand et al., "Overview of the H 264/AVC Video Coding Standard," IEEE Transactions on Circuits and Systems for Video Technology, vol. 13, No. 7, pp. 568, 569, Jul. 1, 2003.

PCT International Search Report and Written Opinion (Date of Mailing: Mar. 26, 2010); PCT/US2009/056473, filed Sep. 10, 2009.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 2007.

Supplemental European Search Report for corresponding European Application No. 09813587.4 mailed Jul. 24, 2012 in 10 pages.

Sze, "Massively Parallel CABAC", VCEG meeting, Jan. 7, 2009, London and MPEG meeting, Aug. 7, 2009, Geneva.

Li E Q et al., "Implementation of H.264 encoder on general-purpose processors with hyper-threading technology", Proceedings of SPIE, pp. 384-395, vol. 5308, No. 1, Jan. 20, 2004.

Sharp, "Entropy slices for parallel entropy decoding", ITU-T SG16 Meeting, Apr. 22, 2008-Feb. 5, 2008, Geneva.

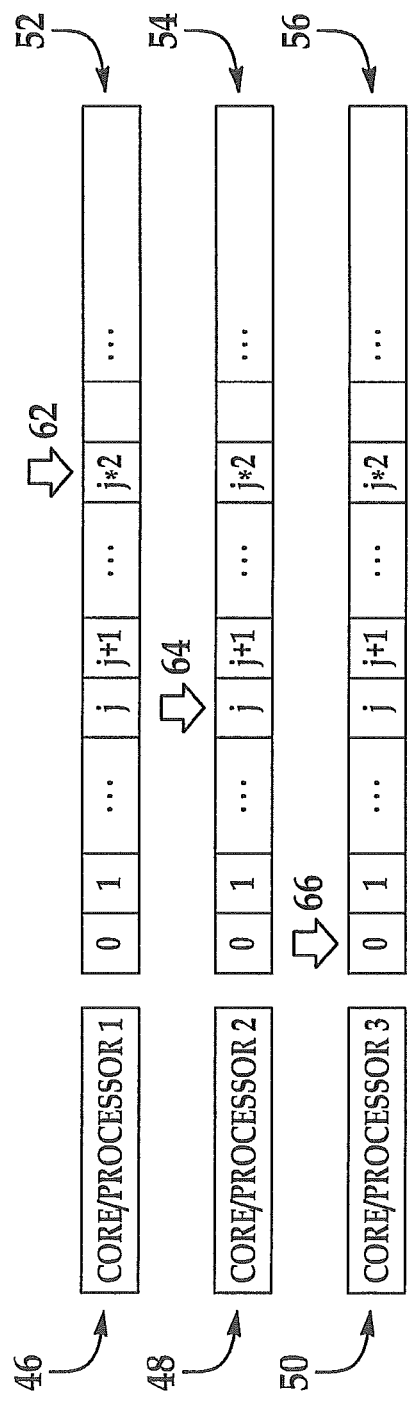
FIG. 6B
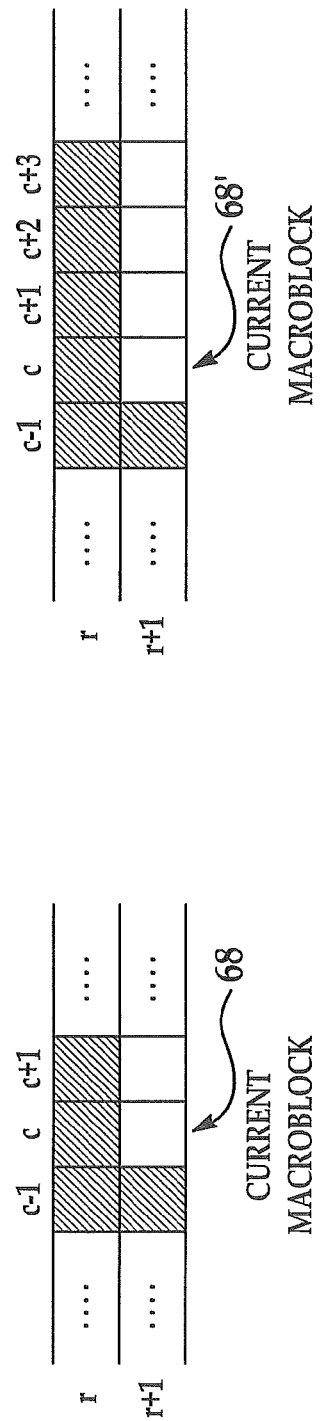
FIG. 7A
FIG. 7B

SYSTEM AND METHOD FOR DECODING USING PARALLEL PROCESSING

CROSS-REFERENCE TO RELATED APPLICATIONS

This application claims priority to U.S. provisional patent application No. 61/096,223, filed Sep. 11, 2008, which is incorporated herein in its entirety by reference.

TECHNICAL FIELD

The present invention relates in general to video decoding using multiple processors.

BACKGROUND

An increasing number of applications today make use of digital video for various purposes including, for example, remote business meetings via video conferencing, high definition video entertainment, video advertisements, and sharing of user-generated videos. As technology is evolving, people have higher expectations for video quality and expect high resolution video with smooth playback at a high frame rate.

There can be many factors to consider when selecting a video coder for encoding, storing and transmitting digital video. Some applications may require excellent video quality where others may need to comply with various constraints including, for example, bandwidth or storage requirements. To permit higher quality transmission of video while limiting bandwidth consumption, a number of video compression schemes are noted including proprietary formats such as VPx (promulgated by On2 Technologies, Inc. of Clifton Park, N.Y.), H.264 standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

There are many types of video encoding schemes that allow video data to be compressed and recovered. The H.264 standard, for example, offers more efficient methods of video coding by incorporating entropy coding methods such as Context-based Adaptive Variable Length Coding (CAVLC) and Context-based Adaptive Binary Arithmetic Coding (CABAC). For video data that is encoded using CAVLC, some modern decompression systems have adopted the use of a multi-core processor or multiprocessors to increase overall video decoding speed.

SUMMARY

An embodiment of the invention is disclosed as a method for decoding a stream of encoded video data including a plurality of partitions that have been compressed using at least a first encoding scheme. The method includes selecting at least a first one of the partitions that includes at least one row of blocks that has been encoded using at least a second encoding scheme. A second partition is selected that includes at least one row of blocks encoded using the second encoding scheme. The first partition is decoded by a first processor, and the second partition is decoded by a second processor. The decoding of the second partition is offset by a specified number of blocks so that at least a portion of the output from the decoding of the first partition is used as input in decoding the second partition. Further, the decoding of the first partition is offset by a specified number of blocks so that at least a portion of the output from the decoding of the second partition is used as input in decoding the first partition.

BRIEF DESCRIPTION OF THE DRAWINGS

The description herein makes reference to the accompanying drawings wherein like reference numerals refer to like parts throughout the several views, and wherein:

FIGS. 6A-6B are timing diagrams illustrating the staging and synchronization of cores on a multi-core processor used in the video decompression system of FIG. 3.

FIG. 7A is a schematic diagram showing data dependent macroblocks and an offset calculation based used in the video compression and decompression systems of FIGS. 2 and 3.

FIG. 7B is a schematic diagram showing data-dependent macroblocks and an alternative offset calculation used in the video compression and decompression systems of FIGS. 2 and 3.

DETAILED DESCRIPTION

Figure 1:
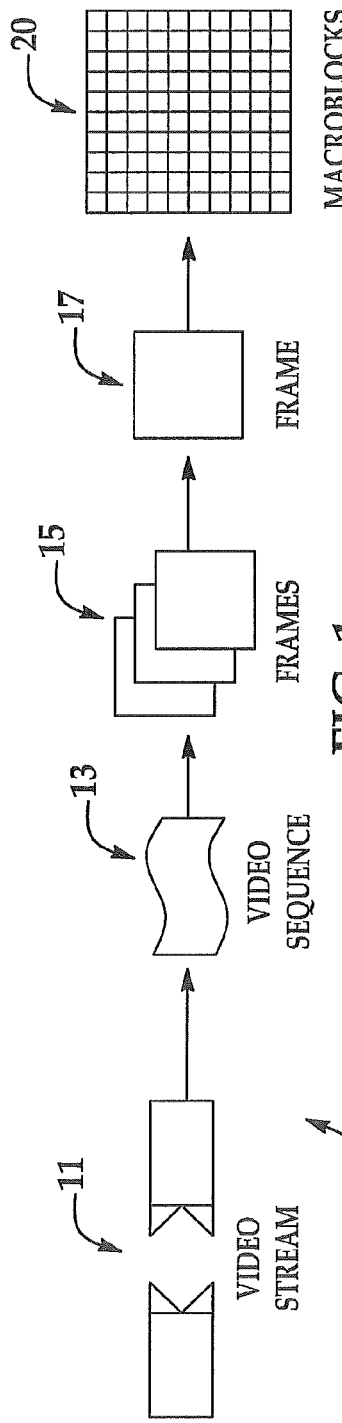
FIG. 1 is a diagram of the hierarchy of layers in a compressed video bitstream in accordance with one embodiment of the present invention.

Referring to FIG. 1, video coding standards, such as H.264, provide a defined hierarchy of layers 10 for a video stream 11. The highest level in the layer can be a video sequence 13. At the next level, video sequence 13 consists of a number of adjacent frames 15. Number of adjacent frames 15 can be further subdivided into a single frame 17. At the next level, frame 17 can be composed of a series of fix-sized macroblocks 20, which contain compressed data corresponding to, for example, a 16×16 block of displayed pixels in frame 17. Each macroblock contains luminance and chrominance data for the corresponding pixels. Macroblocks 20 can also be of any other suitable size such as 16×8 pixel groups or 8×16 pixel groups. Macroblocks 20 are further subdivided into blocks. A block, for example, can be a 4×4 pixel group that can further describe the luminance and chrominance data for the corresponding pixels. Blocks can also be of any other suitable size such as 16×16, 16×8, 8×16, 8×8, 8×4, 4×8 and 4×4 pixels groups.

Although the description of embodiments are described in the context of the VP8 video coding format, alternative embodiments of the present invention can be implemented in the context of other video coding formats. Further, the embodiments are not limited to any specific video coding standard or format.

Figure 2:
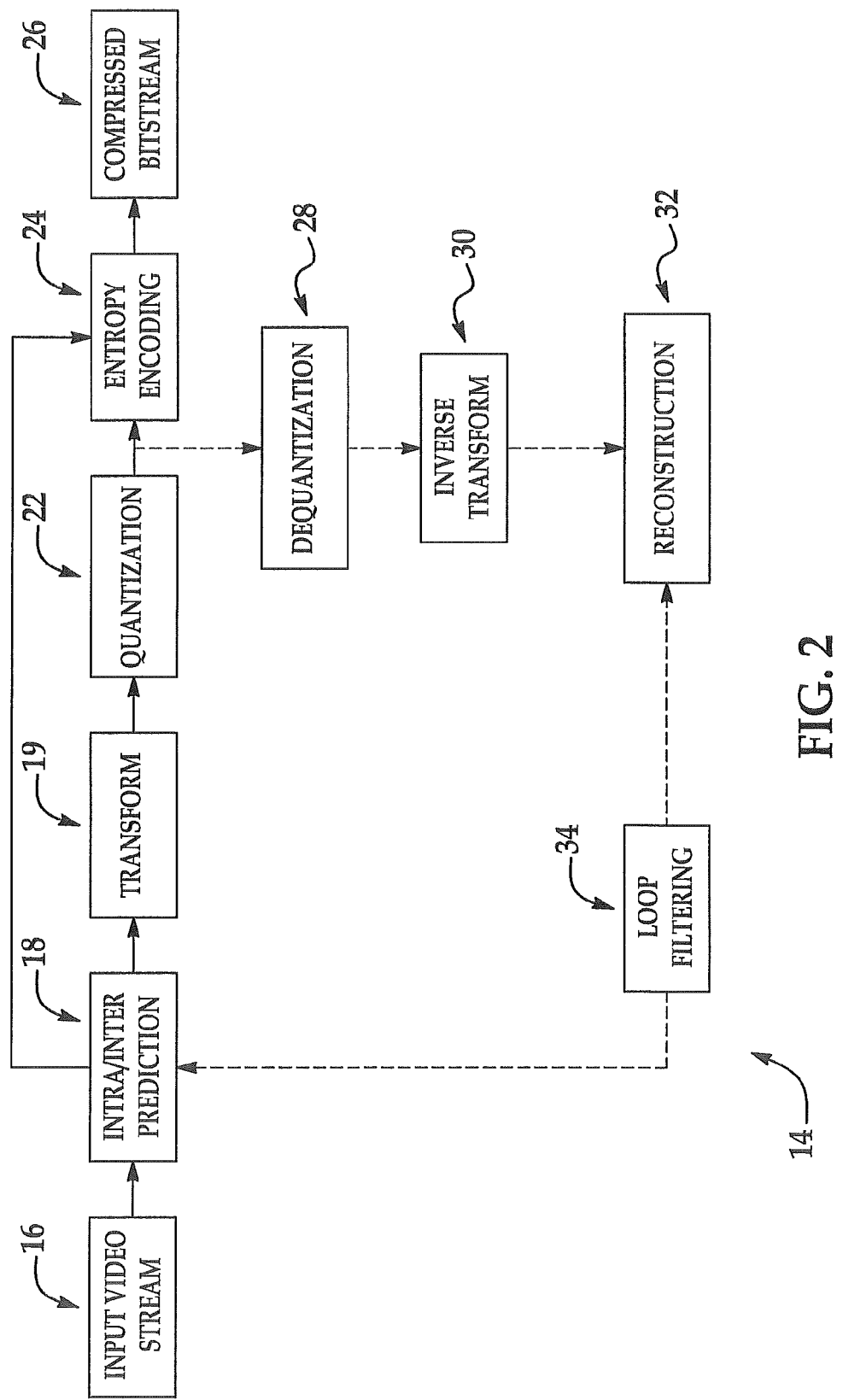
FIG. 2 is a block diagram of a video compression system in accordance with one embodiment of the present invention.

Referring to FIG. 2, in accordance with one embodiment, to encode an input video stream 16, an encoder 14 performs the following functions in a forward path (shown by the solid connection lines) to produce an encoded bitstream 26: intra/inter prediction 18, transform 19, quantization 22 and entropy encoding 24. Encoder 14 also includes a reconstruction path (shown by the dotted connection lines) to reconstruct a frame for encoding of further macroblocks. Encoder 14 performs the following functions in the reconstruction path: dequantization 28, inverse transformation 30, reconstruction 32 and loop filtering 34. Other structural variations of encoder 14 can be used to encode bitstream 26.

When input video stream 16 is presented for encoding, each frame 17 within input video stream 16 can be processed in units of macroblocks. At intra/inter prediction stage 18, each macroblock can be encoded using either intra prediction or interprediction mode. In the case of intra-prediction, a prediction macroblock can be formed from samples in the current frame that have been previously encoded and reconstructed. In the case of inter-prediction, a prediction macroblock can be formed from one or more reference frames that have already been encoded and reconstructed.

Next, still referring to FIG. 2, the prediction macroblock can be subtracted from the current macroblock to produce a residual macroblock (residual). Transform stage 19 transform codes the residual signal to coefficients and quantization stage 22 quantizes the coefficients to provide a set of quantized transformed coefficients. The quantized transformed coefficients are then entropy coded by entropy encoding stage 24. The entropy-coded coefficients, together with the information required to decode the macroblock, such as the type of prediction mode used, motion vectors and quantizer value, are output to compressed bitstream 26.

The reconstruction path in FIG. 2, can be present to permit that both the encoder and the decoder use the same reference frames required to decode the macroblocks. The reconstruction path, similar to functions that take place during the decoding process, which are discussed in more detail below, includes dequantizing the transformed coefficients by dequantization stage 28 and inverse transforming the coefficients by inverse transform stage 30 to produce a derivative residual macroblock (derivative residual). At the reconstruction stage 32, the prediction macroblock can be added to the derivative residual to create a reconstructed macroblock. A loop filter 34 can be applied to the reconstructed macroblock to reduce distortion.

Figure 3:
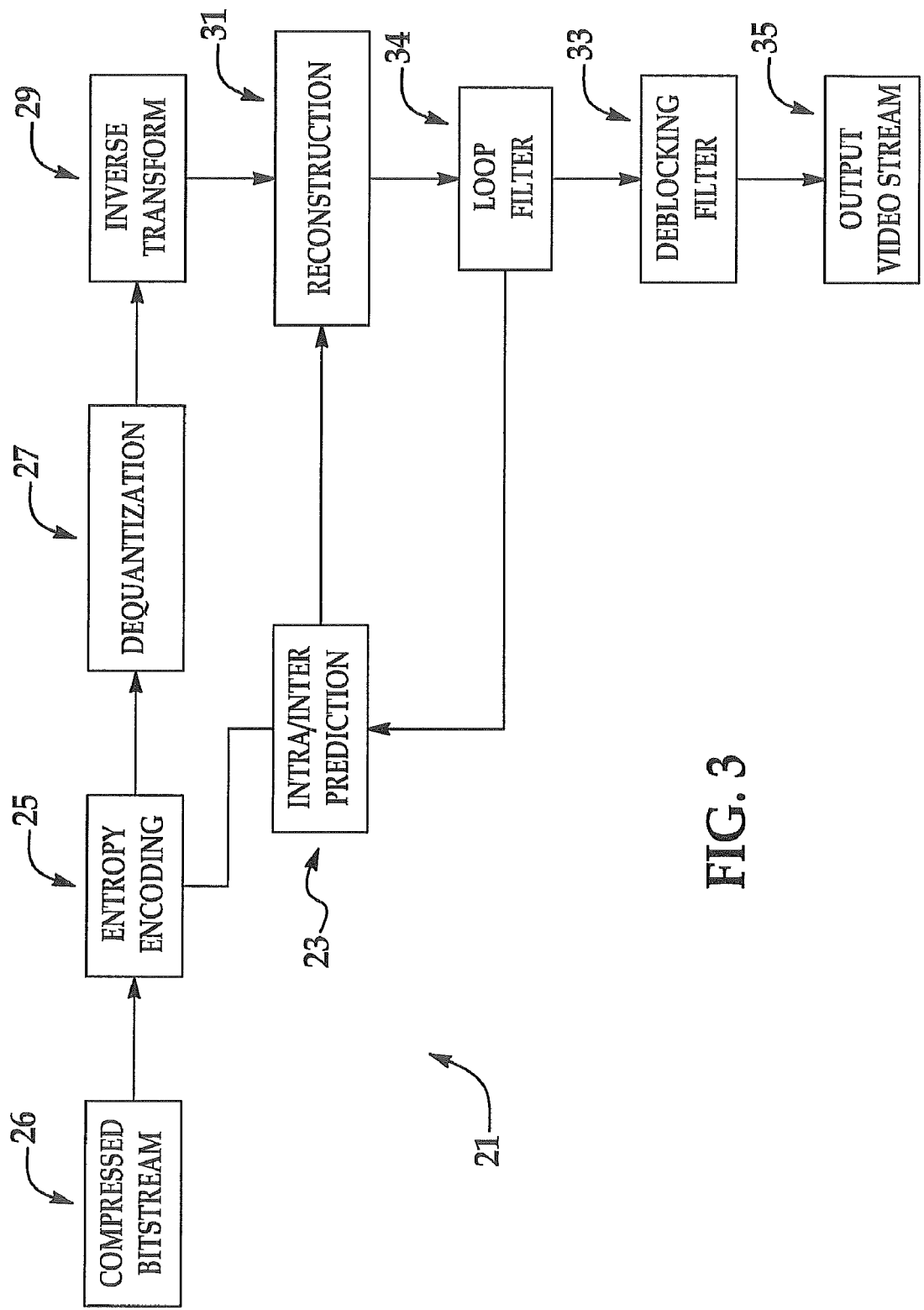
FIG. 3 is a block diagram of a video decompression system in accordance with one embodiment of the present invention.

Referring to FIG. 3, in accordance with one embodiment, to decode compressed bitstream 26, a decoder 21 similar to the reconstruction path of encoder 14 discussed previously, performs the following functions to produce an output video stream 35: entropy decoding 25, dequantization 27, inverse transformation 29, intra/inter prediction 23, reconstruction 31, loop filter 34 and deblocking filtering 33. Other structural variations of decoder 21 can be used to decode compressed bitstream 26.

When compressed bitstream 26 is presented for decoding, the data elements can be decoded by entropy decoding stage 25 to produce a set of quantized coefficients. Dequantization stage 27 dequantizes and inverse transform stage 29 inverse transforms the coefficients to produce a derivative residual that is identical to that created by the reconstruction stage in encoder 14. Using the type of prediction mode and/or motion vector information decoded from the compressed bitstream 26, at intra/inter prediction stage 23, decoder 21 creates the same prediction macroblock as was created in encoder 14. At the reconstruction stage 33, the prediction macroblock can be added to the derivative residual to create a reconstructed macroblock. The loop filter 34 can be applied to the reconstructed macroblock to reduce blocking artifacts. A deblocking filter 33 can be applied to video image frames to further reduce blocking distortion and the result can be outputted to output video stream 35.

Current context-based entropy coding methods, such as Context-based Adaptive Arithmetic Coding (CABAC), are limited by dependencies that exploit spatial locality by requiring macroblocks to reference neighboring macroblocks and that exploit temporal localities by requiring macroblocks to reference macroblocks from another frame. Because of these dependencies and the adaptivity, encoder 14 codes the bitstream in a sequential order using context data from neighboring macroblocks. Such sequential dependency created by encoder 14 causes the compressed bitstream 26 to be decoded in a sequential fashion by decoder 21. Such sequential decoding can be adequate when decoding using a single-core processor. On the other hand, if a multi-core processor or a multi-processor system is used during decoding, the computing power of the multi-core processor or the multi-processor system would not be effectively utilized.

Although the disclosure has and will continue to describe embodiments of the present invention with reference to a multi-core processor and the creation of threads on the multi-core processor, embodiments of the present invention can also be implemented with other suitable computer systems, such as a device containing multiple processors.

Figure 4:
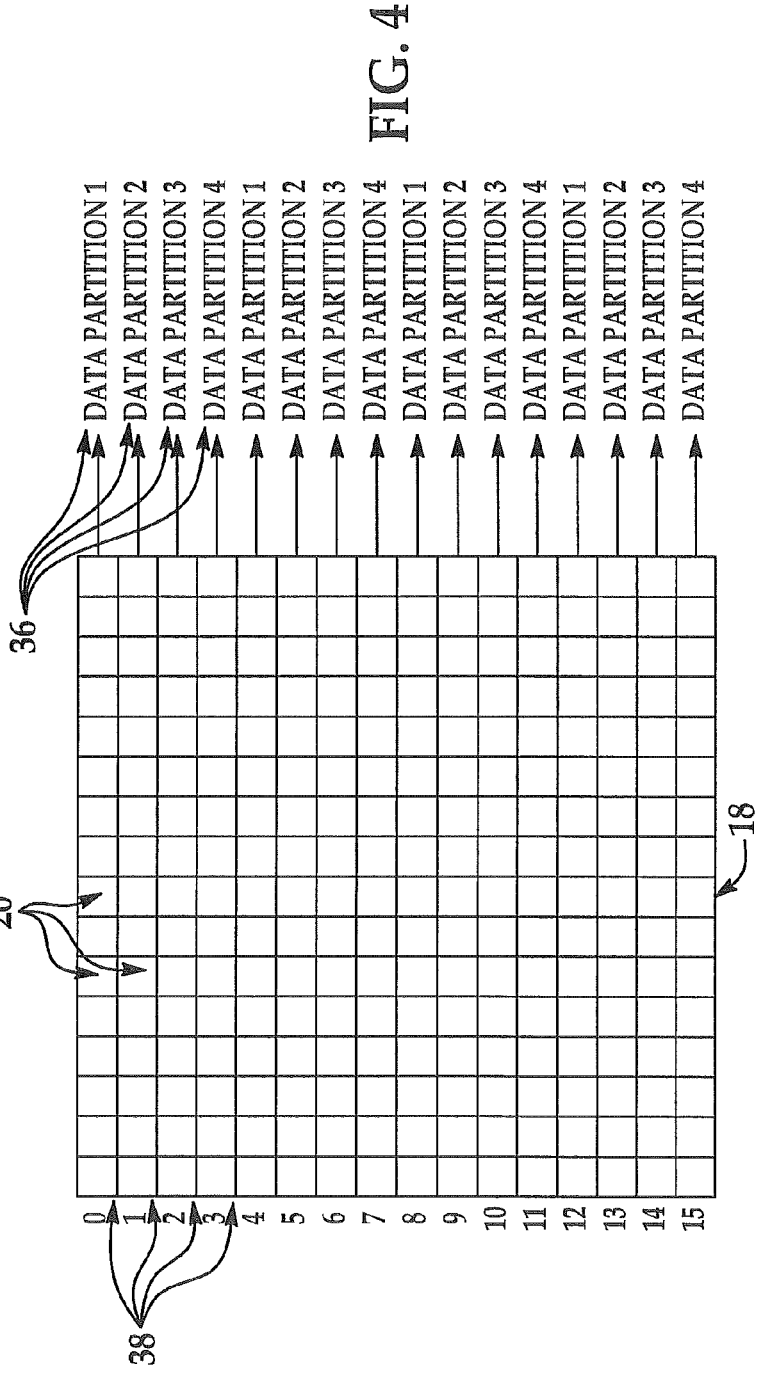
FIG. 4 is a schematic diagram of a frame and its corresponding partitions outputted from the video compression system of FIG. 2.

According to one embodiment, encoder 14 divides the compressed bitstream into partitions 36 rather than a single stream of serialized data. With reference to FIG. 4 and by way of example only, the compressed bitstream can be divided into four partitions, which are designated as Data Partitions 1-4. Other numbers of partitions are also suitable. Since each partition can be the subject of a separate decoding process when they are decoded by decoder 21, the serialized dependency can be broken up in the compressed data without losing coding efficiency.

Referring to FIG. 4, frame 17 is shown with divided macroblock rows 38. Macroblock rows 38 consist of individual macroblocks 20. Continuing with the example, every Nth macroblock row 38 can be grouped into one of partitions 36 (where N is the total number of partitions). In this example, there are four partitions and macroblock rows 0, 4, 8, 12, etc. are grouped into partition 1. Macroblock rows 1, 5, 9 and 13, etc. are grouped into partition 2. Macroblock rows 2, 6, 10, 14, etc. are grouped into partition 3. Macroblock rows 3, 7, 11, 15, etc. are grouped into partition 4. As a result, each partition 36 includes contiguous macroblocks, but in this instance, each partition 36 does not contain contiguous macroblock rows 38. In other words, macroblock rows of blocks in the first partition and macroblock rows in the second partition can be derived from two adjacent macroblock rows in a frame. Other grouping mechanisms are also available and are not limited to separating regions by macroblock row or grouping every Nth macroblock row into a partition. Depending on the grouping mechanism, in another example, macroblock rows that are contiguous may also be grouped into the same partition 36.

An alternative grouping mechanism may include, for example, grouping a row of blocks from a first frame and a corresponding row of blocks in a second frame. The row of blocks from the first frame can be packed in the first partition and the corresponding row of blocks in the second frame can be packed in the second partition. A first processor can decode the row of blocks from the first frame and a second processor can decode the row of blocks from the second frame. In this manner, the decoder can decode at least one block in the second partition using information from a block that is already decoded by the first processor.

Each of the partitions 36 can be compressed using two separate encoding schemes. The first encoding scheme can be lossless encoding using, for example, context-based arithmetic-coding like CABAC. Other lossless encoding techniques may also be used. Referring back to FIG. 1, the first encoding scheme may be realized by, for example, entropy encoding stage 24.

Still referring to FIG. 1, the second encoding scheme, which can take place before the first encoding scheme, may be realized by at least one of intra/inter prediction stage 18, transform stage 19, and quantization 22. The second encoding scheme can encode blocks in each of the partitions 36 by using information contained in other partitions. For example, if a frame is divided into two partitions, the second encoding scheme can encode the second partition using information contained in the macroblock rows of the first partition.

Figure 5:
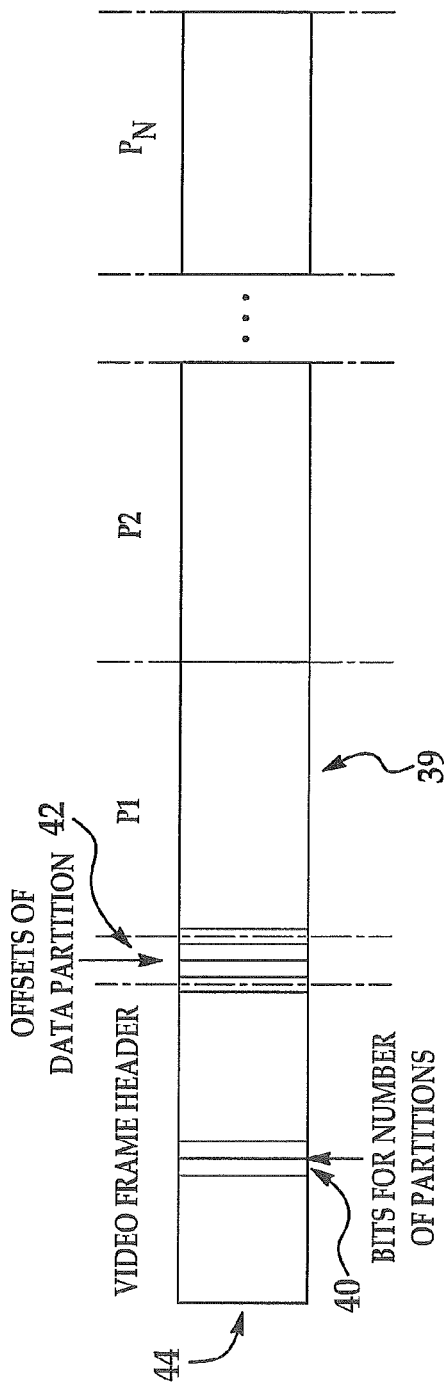
FIG. 5 is a schematic diagram of an encoded video frame in a bitstream outputted from the video compression system of FIG. 2 and sent to the video decompression system of FIG. 3.

Referring to FIG. 5, an encoded video frame 39 from compressed bitstream 26 is shown. For simplicity, only parts of the bitstream that are pertinent to embodiments of the invention are shown. Encoded video frame 39 contains a video frame header 44 which contains bits for a number of partitions 40 and bits for offsets of each partition 42. Encoded video frame 39 also includes the encoded data from data partitions 36 illustrated as $P_1$-$P_N$ where, as discussed previously, N is the total number of partitions in video frame 17.

Once encoder 14 has divided frame 17 into partitions 36, encoder 14 writes data into video frame header 44 to indicate number of partitions 40 and offsets of each partition 42. Number of partitions 40 and offsets of each partition 42 can be represented in frame 17 by a bit, a byte or any other record that can relay the specific information to decoder 21. Decoder 21 reads the number of data partitions 40 from video frame header 44 in order to decode the compressed data. In one example, two bits may be used to represent the number of partitions. One or more bits can be used to indicate the number of data partitions (or partition count). Other coding schemes can also be used to code the number of partitions into the bitstream. The following list indicates how two bits can represent the number of partitions:

| BIT 1 | BIT 2 | NUMBER OF PARTITIONS |
|---|---|---|
| 0 | 0 | One partition |
| 0 | 1 | Two partitions |
| 1 | 0 | Four partitions |
| 1 | 1 | Eight partitions |

If the number of data partitions is greater than one, decoder 21 also needs information about the positions of the data partitions 36 within the compressed bitstream 26. The offsets of each partition 42 (also referred to as partition location offsets) enable direct access to each partition during decoding.

In one example, offset of each partition 42 can be relative to the beginning of the bitstream and can be encoded and written into the bitstream 26. In another example, the offset for each data partition can be encoded and written into the bitstream except for the first partition since the first partition implicitly begins in the bitstream 26 after the offsets of each partition 42. The foregoing is merely exemplary. Other suitable data structures flags or records such words and bytes, can be used to transmit partition count and partition location offset information.

Although the number of data partitions can be the same for each frame 17 throughout the input video sequence 16, the number of data partitions may also differ from frame to frame. Accordingly, each frame 17 would have a different number of partitions 40. The number of bits that are used to represent the number of partitions may also differ from frame to frame. Accordingly, each frame 17 could be divided into varying numbers of partitions.

Once the data has been compressed into bitstream 26 with the proper partition data information (i.e. number of partitions 40 and offsets of partitions 42), decoder 21 can decode the data partitions 36 on a multi-core processor in parallel. In this manner, each processor core may be responsible for decoding one of the data partitions 36. Since multi-core processors typically have more than one processing core and shared memory space, the workload can be allocated between each core as evenly as possible. Each core can use the shared memory space as an efficient way of sharing data between each core decoding each data partition 36.

For example, if there are two processors decoding two partitions, respectively, the first processor will begin decoding the first partition. The second processor can then decode macroblocks of the second partition and can use information received from the first processor, which has begun decoding macroblocks of the first partition. Concurrently with the second processor, the first processor can continue decoding macroblocks of the first partition and can use information received from the second processor. Accordingly, both the first and second processors can have the information necessary to properly decode macroblocks in their respective partitions.

Furthermore, as discussed in more detail below, when decoding a macroblock row of the second partition that is dependent on the first partition, a macroblock that is currently being processed in the second partition is offset by a specified number of macroblocks. In this manner, at least a portion of the output of the decoding of the first partition can be used as input in the decoding of the macroblock that is currently being processed in the second partition. Likewise, when decoding a macroblock row of the first partition that is dependent on the second partition, a macroblock that is currently being processed in the first partition is offset by a specified number of macroblocks so that at least a portion of the output of the decoding of the second partition can be used as input in the decoding of the macroblock that is currently being processed in the first partition.

When decoding the compressed bitstream, decoder 21 determines the number of threads needed to decode the data, which can be based on the number of partitions 40 in each encoded frame 39. For example, if number of partitions 40 indicates that there are four partitions in encoded frame 39, decoder 21 creates four threads with each thread decoding one of the data partitions. Referring to FIG. 4, as an example, decoder 21 can determine that four data partitions have been created. Hence, if decoder 21 is using a multi-core processor, it can create four separate threads to decode the data from that specific frame.

As discussed previously, macroblocks 20 within each frame use context data from neighboring macroblocks when being encoded. When decoding macroblocks 20, the decoder will need the same context data in order to decode the macroblocks properly. On the decoder side, the context data can be available only after the neighboring macroblocks have already been decoded by the current thread or other threads. In order to decode properly, the decoder includes a staging and synchronization mechanism for managing the decoding of the multiple threads.

Figure 6A:
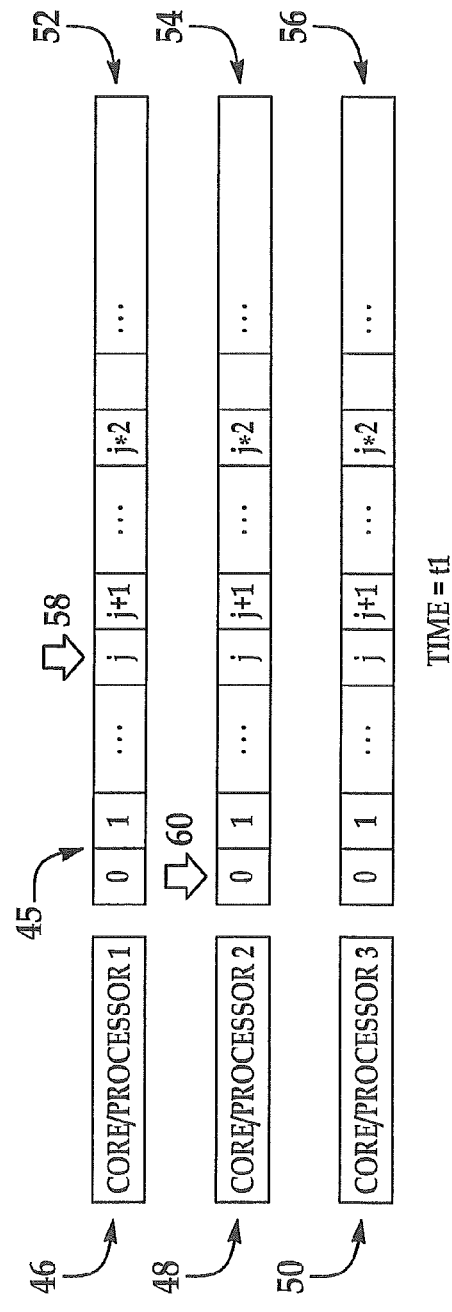

With reference to FIGS. 6A and 6B, a time diagram shows the staging and synchronization mechanism to decode partitions 36 on threads of a multi-core processor in accordance with an embodiment of the present invention. FIGS. 6A and 6B illustrate an exemplary partial image frame 45 at various stages of the decoding process. The example is simplified for purposes of this disclosure and the number of partitions 36 is limited to three. Each partition 36 can be assigned to one of the three threads 46, 48 and 50. As discussed previously, each partition 36 includes contiguous macroblocks.

As depicted in FIGS. 6A and 6B, as an example, three threads 46, 48 and 50 are shown, and each of threads 46, 48 and 50 are capable of performing decoding in parallel with each other. Each of the three threads 46, 48 and 50 processes one partition in a serial manner while all three partitions 40 are processed in parallel with each other.

Each of FIGS. 6A and 6B contain an arrow that illustrates which macroblock is currently being decoded in each macroblock row, which macroblocks have been decoded in each macroblock row and which macroblocks have yet to be decoded in each macroblock row. If the arrow is pointing to a specific macroblock, that macroblock is currently being decoded. Any macroblock to the left of the arrow (if any) has already been decoded in that row. Any macroblock to the right of the arrow has yet to be decoded. Although the macroblocks illustrated in FIGS. 6A and 6B all have similar sizes, the techniques of this disclosure are not limited in this respect. Other block sizes, as discussed previously, can also be used with embodiments of the present invention.

Referring to FIG. 6A, at time t1, thread 46 has initiated decoding of a first macroblock row 52. Thread 46 is currently processing macroblock j in first macroblock row 52 as shown by arrow 58. Macroblocks 0 to j−1 have already been decoded in first macroblock row 52. Macroblocks j+1 to the end of first macroblock row 52 have yet to be decoded in first macroblock row 52. Thread 48 has also initiated decoding of a second macroblock row 54. Thread 48 is currently processing macroblock 0 in second macroblock row 54 as shown by arrow 60. Macroblocks 1 to the end of second macroblock row 54 have been decoded in second macroblock row 54. Thread 50 has not begun decoding of a third macroblock row 56. No macroblocks have been decoded or are currently being decoded in third macroblock row 56.

Referring to FIG. 6B, at time t2, thread 46 has continued decoding of first macroblock row 52. Thread 46 is currently processing macroblock j*2 in first macroblock row 52 as shown by arrow 62. Macroblocks 0 to j*2−1 have already been decoded in first macroblock row 52. Macroblocks j*2+1 to the end of first macroblock row 52 have yet to be decoded in first macroblock row 52. Thread 48 has also continued decoding of second macroblock row 54. Thread 48 is currently processing macroblock j in second macroblock row 54 as shown by arrow 64. Macroblocks 0 to j−1 have already been decoded in second macroblock row 54. Macroblocks j+1 to the end of second macroblock row 54 have yet to be decoded in second macroblock row 54. Thread 50 has also initiated decoding of a third macroblock row 56. Thread 50 is currently processing macroblock 0 in third macroblock row 56 as shown by arrow 66. Macroblocks 1 to the end of third macroblock row 56 have yet to be decoded in third macroblock row 56.

Previous decoding mechanisms were unable to efficiently use a multi-core processor to decode a compressed bitstream because processing of a macroblock row could not be initiated until the upper adjacent macroblock row had been completely decoded. The difficulty of previous decoding mechanisms stems from the encoding phase. When data is encoded using traditional encoding techniques, spatial dependencies within macroblocks imply a specific order of processing of the macroblocks. Furthermore, once the frame has been encoded, a specific macroblock row cannot be discerned until the row has been completely decoded. Accordingly, video coding methods incorporating entropy coding methods such as CABAC created serialized dependencies which were passed to the decoder. As a result of these serialized dependencies, decoding schemes had limited efficiency because information for each computer processing system (e.g. threads 46, 48 and 50) was not available until the decoding process has been completed on that macroblock row.

Utilizing the parallel processing staging and synchronization mechanism illustrated in FIGS. 6A and 6B allows decoder 21 to efficiently accelerate the decoding process of image frames. Because each partition 36 can be subject to a separate decoding process, interdependencies between partitions can be managed by embodiments of the staging and synchronization scheme discussed previously in connection with FIGS. 6A and 6B. Using this staging and synchronization decoding scheme, each thread 46, 48 and 50 that decodes an assigned partition can exploit context data from neighboring macroblocks. Thus, decoder 21 can decode macroblocks that contain context data necessary to decode a current macroblock before the preceding macroblock row has been completely decoded.

Referring again to FIGS. 6A and 6B, offset j can be determined by examining the size of the context data used in the preceding macroblock row (e.g. measured in a number of macroblocks) during the encoding process. Offset j can be represented in frame 17 by a bit, a byte or any other record that can relay the size of the context data to decoder 21. FIGS. 7A and 7B illustrate two alternatives for the size of offset j.

Referring to FIG. 7A, in one embodiment, current macroblock 68 is currently being processed. Current macroblock 68 used context data from the left, top-left, top and top-right macroblocks during encoding. In other words, current macroblock 68 uses information from macroblocks: (r+1, c−1), (r, c−1), (r, c) and (r, c+1). In order to properly decode current macroblock 68, macroblocks (r+1, c−1), (r, c−1), (r, c) and (r, c+1) should be decoded before current macroblock 68. Since, as discussed previously, decoding of macroblocks can be performed in a serial fashion, macroblock (r+1, c−1) can be decoded before current macroblock 68. Further, in the preceding macroblock row (i.e. macroblock row r), since the encoding process uses (r, c+1) as the rightmost macroblock, the decoder can use (r, c+1) as the rightmost macroblock during decoding as well. Thus, offset j can be determined by subtracting the column row position of rightmost macroblock of the preceding row used during encoding of the current macroblock from the column row position of the current macroblock being processed. In FIG. 7A, offset j would be determined by subtracting the column row position of macroblock (r, c+1) from the column position of current macroblock 68 (i.e. (r+1, c)), or c+1−c, giving rise to an offset of 1.

Referring to FIG. 7B, in one embodiment, current macroblock 68' is currently being processed. Current macroblock 68' uses information from macroblocks: (r+1, c−1), (r, c−1), (r, c), (r, c+1), (r, c+2) and (r, c+3). In order to properly decode current macroblock 68', macroblocks (r+1, c−1), (r, c−1), (r, c) (r, c+1), (r, c+2) and (r, c+3) should be decoded before current macroblock 68'. Since, as discussed previously, decoding of macroblocks can be performed in a serial fashion, macroblock (r+1, c−1) can be decoded before current macroblock 68'. Further, in the preceding macroblock row (i.e. macroblock row r), since the encoding process uses (r, c+3) as the rightmost macroblock, the decoder can use (r, c+3) as the rightmost macroblock during decoding as well. As discussed previously, offset j can be determined by subtracting the column row position of rightmost macroblock of the preceding row used during encoding of the current macroblock from the column row position of the current macroblock being processed. In FIG. 7A, offset j would be calculated by subtracting the column row position of macroblock (r, c+3) from the column position of current macroblock 68' (i.e. (r+1, c)), or c+3−c, giving rise to an offset of 3.

In the preferred embodiment, the offset can be determined by the specific requirements of the codec. In alternative embodiments, the offset can be specified in the bitstream.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for decoding a stream of encoded video data, the stream of encoded video data including at least one frame divided into a plurality of partitions, comprising:

identifying partition data information indicative of a partition location for each of at least some of the plurality of partitions;

identifying, based on the partition data information, at least a first one of the plurality of partitions that includes at least one row of blocks;

identifying, based on the partition data information, at least a second one of the plurality of partitions that includes at least one row of blocks, wherein the first partition and the second partition have each been individually compressed using at least a first encoding scheme and a second encoding scheme;

decoding, using a first processor, the first partition; and decoding, using a second processor, the second partition, wherein the decoding of the second partition is offset by a specified number of blocks so that at least a portion of the output from the decoding of the first partition is used as input in decoding the second partition in accordance with the first encoding scheme.

2. The method of claim 1, wherein the first encoding scheme includes lossless encoding and the second encoding scheme includes at least one of intra-frame prediction and inter-frame prediction.

3. The method of claim 2, wherein the at least one row of blocks in the first partition and the at least one row of blocks in the second partition are derived from two adjacent rows in the at least one frame.

4. The method of claim 2, wherein the lossless encoding is an entropy encoding scheme.

5. The method of claim 1, wherein at least a portion of a row of blocks of the output from the decoding of the second partition is used as input in decoding at least a portion of another row of blocks in the first partition in accordance with at least one of the first encoding scheme and the second encoding scheme.

6. The method of claim 5, wherein the row in the second partition is adjacent in the at least one frame to the row in the first partition.

7. The method of claim 1, wherein the second encoding scheme is configured to encode the at least one row of blocks in the first partition using context information contained in the at least one row of blocks in the second partition.

8. The method of claim 1, wherein the second encoding scheme is configured to encode the at least one row of blocks in the second partition using context information contained in the at least one row of blocks in the first partition.

9. The method of claim 8, wherein the second encoding scheme includes at least one of intra-frame prediction and inter-frame prediction.

10. The method of claim 8, wherein the at least one row of blocks in the first partition and the at least one row of blocks in the second partition are derived from two adjacent rows in an image frame represented by the video data, and wherein decoding the second partition further comprises:

decoding at least one block in the second partition using information from a block that is already decoded by the first processor, wherein the at least one block in the second partition and the already decoded block in first partition are adjacent to each other the image frame.

11. The method of claim 8, wherein decoding the second portion further comprises:

using at least a portion of the context information of the blocks most recently decoded by the first processor as context data for decoding at least one block in the second partition.

12. The method of claim 8, wherein the specified offset is determined based upon the size of the context used by the second encoding scheme.

13. The method of claim 8, wherein the at least one row of blocks in the first partition and the at least one row of blocks in the second partition are derived from corresponding rows in two successive frames of the video data, and wherein decoding the second partition further comprises:

decoding at least one block in the second partition using information from a block that is already decoded by the first processor.

14. The method of claim 1, further comprising:

reading in the video data a record that indicates the number of partitions.

15. The method of claim 1, further comprising:

reading in the video data a record that indicates the specified number of blocks.

16. The method of claim 1, wherein identifying partition data information indicative of a partition location for each of at least some of the plurality of partitions comprises:

reading, from the stream of encoded video data, a record that indicates the partition location for each of the at least some of the plurality of partitions within the encoded video data.

17. The method of claim 1, wherein the first encoding scheme is context-based arithmetic coding.

18. A method for decoding a stream of encoded video data including at least one frame having a plurality of rows of blocks divided into a plurality of partitions:

providing a plurality of processors having shared primary memory space;

reading partition data information in the encoded video data that indicates a partition count and a partition location for each of at least some of the plurality of partitions;

identifying, based on the partition data information, a first one and a second one of the plurality of partitions, wherein the first one of the plurality of partitions includes encoded context information that can be used to decode the second one of the plurality of partitions and wherein the first one and the second one of the plurality of partitions have each been individually compressed using at least a first encoding scheme and a second encoding scheme;

decoding the first one of the plurality of partitions in accordance with the second encoding scheme, using a first one of the plurality of processors; and decoding the second one of the plurality of partitions in accordance with the first decoding scheme, using a second one of the plurality of processors, wherein the decoding of the second partition is offset by a specified number of blocks, the specified number at least as large as the number of blocks in the encoded context information; wherein at least a portion of the output from the decoding of the first partition is used as input in decoding the second partition.

19. The method of claim 1, wherein the first partition and the second partition each include non-adjacent rows of blocks in the at least one frame.

* * * * *